United States Patent Office 2,878,257
Patented Mar. 17, 1959

2,878,257

PRODUCTION OF CYCLOHEPTENE-(1)-CARBOXYLIC ACID-(1), ITS ALKALI METAL SALTS AND ITS ESTERS

Hans Moell and Otto Schlichting, Ludwigshafen (Rhine), Germany, assignors to Badische Anilin- & Soda-Fabrik Aktiengesellschaft, Ludwigshafen (Rhine), Germany No Drawing. Application November 2, 1956
Serial No. 619,932

6 Claims. (Cl. 260—468)

This invention relates to a new process for the production of cycloheptene-(1)-carboxylic acid-(1), its alkali metal salts and its esters. In particular it relates to a process which starts from an initial material not hitherto used for the production of cycloheptene-(1)-carboxylc acid-(1).

It is already known that cycloheptene-(1)-carboxylic acid-(1), which is also known as Δ1-suberene acid, is obtained by boiling 1-chlorcycloheptane carboxylic acid with caustic soda solution or treating it with alcoholic potash. It is also known that by heating 2-bromocycloheptane carboxylic acid with quinoline, cycloheptene-(1)-carboxylic acid-(1) is formed in addition to cycloheptene-(2)-carboxylic acid.

The object of this invention is to widen the basis for the production of cycloheptene-(1)-carboxylic acid by the use of new initial materials. A further object is to provide a simple process which can be carried out readily technically by which the hitherto unused initial material is converted in good yields into cycloheptane-(1)-carboxylic acid.

We have found that cycloheptene-(1)-carboxylic acid-(1) is obtained in a simple manner by treating a 2,8-dihalogen-cyclo-octanone with an alkaline-reacting alkali metal compound selected from the group consisting of alkali metal alcoholates and alkali metal hydroxides in the presence of a liquid medium which does not react with the alkali metal compound used.

Suitable alkali metal alcoholates are especially the sodium or potassium alcoholates of low aliphatic saturated alcohols, such as methanol, ethanol, normal- and iso-propanol, and also those of lithium. Of the alkali metal hydroxides there may be mentioned as examples sodium hydroxide, potassium hydroxide and lithium hydroxide.

As the reaction medium it is preferable to choose alcohols, in particular when using alcoholates, which form the basis of the alcoholates. Liquid organic substances, such as ether and hydrocarbons can however also be used. When the reaction of the 2,8-dihalogen-cyclo-octanes is effected with alkali metal hydroxides, water is especially suitable.

For the reaction of the 2,8-dihalogencyclo-octanes, for example the dichlor or dibrom compound, which are obtainable in the usual way by halogenation of cyclo octanone, the alcoholate solutions or the alcoholic or aqueous solutions of the alkali metal hydroxides are added in such amounts that for each mol of the dihalogencyclo-octanone there are present at least 2 mols of alkali metal hydroxide or alcoholate. It is advantageous to use about 3 to 5 mols of the alkali metal hydroxide or alcoholate, for each mol of dihalogencyclo-octanone.

The alkali metal alcoholates or alkali metal hydroxides can be used either as dilute solutions, as for example as about 1 to 10% solutions or in higher concentrations, as for example as 10 to 50% solutions at which the statement of percentage is by weight. It is especially preferable to work with about 3 to 10% solution. The reaction can be carried out at ordinary, reduced or increased temperature, for example at the boiling temperature of the reaction mixture. In general the reaction temperatures lie between about 0° C. and 100° C. It is advantageous to work at 0° to 30° C. When working at elevated temperature the use of closed vessels may be necessary. Since the reaction proceeds sufficiently rapidly and with strong evolution of heat even at low temperatures, it is preferable to commence the reaction at low temperatures, as for example at about 0° to +15° C. Higher temperatures, as for example above 30° C., are disadvantageous in so far as large amounts of resinous by products may be formed.

The reaction is preferably effected by introducing into the solution of the alkali metal alcoholate or hydroxide the 2,8-dihalogencyclo-octanone in solid or dissolved form. As solvent, methanol or ethanol may serve. The reaction components may however also be brought together in other sequences. If the reaction is carried out while using alcohols, for example the lower aliphatic alcohols, there are obtained as reaction products the esters of cycloheptene-(1)-carboxylic acid-(1) with these alcohols, whereas when working in water and using at least 3 mols of alkali hydroxide per mol of dihalogencyclo-octanone, the alkali metal salts of the acids are obtained. The acid may be recovered from these derivatives in the usual way, for example when using a salt by acidification with mineral acids such as sulfuric acid, halogen hydracids and phosphorus acids.

It is surprising that by the reaction of halogencyclo-octanones there is formed the unsaturated cycloheptene-(1)-carboxylic acid-(1) whereas the corresponding halogen compounds of cyclohexanone lead to cyclopentane carboxylic acids.

Cycloheptene-(1)-carboxylic acid-(1) is a valuable intermediate product for the production of medicaments. The free acid is eminently suitable as cholagogic agent.

The following examples will further illustrate this invention but the invention is not restricted to these examples. The parts specified in the examples are parts by weight.

Example 1

160 parts of 2,8-dibromocyclo-octanone (melting point 72° to 73° C.; obtained by treatment of 525 parts of cyclo-octanone in 2000 parts of carbon tetrachloride at 0° to +5° C. with 1350 parts of bromine in a yield of 900 parts (75.5% of the theoretical yield) and recrystallized from petroleum ether) are vigorously stirred with 1500 parts of 10% aqueous caustic potash solution while cooling with ice. When the whole has passed into solution, it is stirred for another hour at about +5° C., the solution is acidified with 20% sulfuric acid and extracted with ether. The ethereal solution is dried with sodium sulfate and the ether distilled off. The residue solidifies to colorless crystals and consists of 62 parts (77.5% of the theoretical yield) of cycloheptene-(1)-carboxylic acid-(1). The acid has a melting point of 54° C. after recrystallization from petroleum ether.

Example 2

100 parts of 2,8-dibromocyclo-octanone are boiled under reflux with 200 parts of a 50% aqueous potassium hydroxide solution. After cooling, the solution is acidified with 20% sulfuric acid and extracted with ether. The ether is evaporated and 46 parts of cycloheptene-(1)-carboxylic acid-(1) are obtained (equal to 65% of the theoretical yield). Sodium hydroxide may be used instead of potassium hydroxide with the same result.

Example 3

30 parts of 2,8-dibromo-cyclo-octanone are vigorously stirred with a solution of 20 parts of potassium hydroxide in 900 parts of water while cooling with ice, the temperature being kept at +2° C. After stirring for an hour, it is acidified with 1-n sulfuric acid and the solution extracted with ether. 11 parts of cycloheptene-(1)-carboxylic acid-(1), equivalent to 73.3% of the theoretical yield, are obtained from the ethereal solution.

Example 4

50 parts of 2,8-dichlorocyclo-octanone are introduced, while stirring well and cooling with ice, into 400 parts of a 10% aqueous sodium hydroxide solution, and stirring continued until all has passed into solution. The temperature is kept at +5° C. After stirring for an hour, it is acidified with 2-n sulfuric acid and the solution extracted with ether. After distilling off the ether there remain 26 parts (72% of the theoretical yield) of cycloheptene-(1)-carboxylic acid-(1).

The 2,8-dichlorocyclo-octanone used is obtained by the treatment of cyclo-octanone with chlorine in carbon tetrachloride at 20° to 25° C. until there has been an increase in weight corresponding to two atoms of chlorine for each molecule of cyclo-octanone. It is a colorless liquid having the boiling point 127° to 129° C. at 13 Torr. and solidifies to crystals upon prolonged standing.

Example 5

35 parts of 2,8-dibromocyclo-octanone are slowly added, while stirring, to 100 parts of a 10% solution of sodium methylate in methanol, cooled down to 0° C., in such a manner that the temperature of the reaction mixture does not exceed +5° C. After stirring for one hour the reaction solution is acidified with 2-n sulfuric acid and extracted with ether. After distilling off the ether, the residue is distilled in vacuo. There are obtained 13 parts (=65% of the theoretical yield) of cycloheptene-(1)-carboxylic acid methyl ester-(1) as a colorless liquid with a pleasant ester-like smell, the liquid boiling at 52° to 54° C. at 0.5 Torr.

Example 6

35 parts of 2,8-dibromocyclo-octanone are slowly added to 100 parts of a 10% solution of potassium hydroxide in ethanol which has been cooled to 0° C. When, after about an hour, all has passed into solution, it is acidified with 2-n sulfuric acid and the reaction product taken up in ether. After distilling off the ether, the residue is distilled in vacuo. 15.3 parts (69% of the theoretical yield) of cycloheptene-(1)-carboxylic acid ethyl ester-(1) are obtained as a colorless liquid having an esterlike smell and a boiling point of 62° to 65° C. at 0.5 Torr.

Example 7

40 parts of 2,8-dichlorocyclooctane are slowly added, with vigorous stirring, to 250 parts of a 20% solution of sodium butylate at a temperature of 10° C., so that the temperature does not rise above 20° C. When all of the 2,8-dichlorocyclooctane has been added, the mixture is kept stirring for an hour at room temperature, acidified with 2-normal sulfuric acid while cooling and the butyl ester of cycloheptene-(1)-carboxylic acid-(1) is extracted with ether. After drying and distilling off the ether 29 parts of the ester (=71% of the theoretical yield) being obtained as a colorless liquid which boils at 116° C. at a pressure of 0.1 millimeter Hg.

Example 8

25 parts of 2,8-dichlorocyclooctane are allowed to flow into 150 parts of a 10% cyclohexanol solution of potassium hydroxide, which has been cooled down to 0° C., with stirring and cooling, so that the temperature does not rise above 0° to 5° C. When all of the 2,8-dichlorocyclooctane has been added, the mixture is kept stirring for an hour at room temperature, acidified with 2-normal sulfuric acid and extracted with ether. The combined ether extracts are stripped of the solvent by distillation and the residue is fractionally distilled in vacuo. The cyclohexanol ester of the cycloheptene-(1)-carboxylic acid-(1) boils at 118° to 120° C. at a pressure of 0.1 to 0.3 millimeter Hg. The yield is 19 parts i. e. 69% of the theoretical yield.

What we claim is:

1. A process for the production of a member selected from the group consisting of cycloheptene-(1)-carboxylic acid-(1), its alkali metal salts and esters which comprises treating a 2,8-dihalogencyclooctanone with at least the calculated molar amount of an alkaline-reacting alkali metal compound selected from the group consisting of alkali metal alcoholates and alkali metal hydroxides in a concentration of 1–50% at a temperature of 0°–100° C. in the presence of a liquid medium which does not react with the alkali metal compound used.

2. A process for the production of a member selected from the group consisting of cycloheptene-(1)-carboxylic acid-(1) and its alkali metal salts which comprises reacting a 2,8-dihalogencyclooctanone with at least the calculated molar amount of an alkaline-reacting alkaline metal compound selected from the group consisting of alkali metal alcoholates and alkali metal hydroxides in a concentration of 1–50% at a temperature between 0° C. and 100° C. in the presence of a liquid non-alcoholic medium which does not react with the alkali metal compound used.

3. The process for the production of a member selected from the group consisting of cycloheptene-(1)-carboxylic acid-(1) and its alkali metal salts which comprises reacting a 2,8-dihalogencyclo-octanone with at least the calculated molar amount of an alkali metal hydroxide in the presence of water in a concentration of 1–50% at a temperature between 0° C. and 100° C.

4. The process claimed in claim 3, wherein an aqueous solution containing 1 to 50% by weight of an alkali metal hydroxide is used for reaction with the 2,8-dihalogencyclo-octanone at temperature of 0°–30° C.

5. A process for the production of an aliphatic ester of cycloheptene-(1)-carboxylic acid-(1) which comprises reacting a 2,8-dihalogencyclo-octanone with at least twice the molar amount of an alkaline reacting alkali metal compound from the group consisting of alkali metal alcoholates and alkali metal hydroxides in a concentration of from 1–50% in the presence of an aliphatic alcohol at a temperature of 0°–100° C.

6. The process claimed in claim 5, at which the alcohol used is that forming the basis of the alkali metal alcoholate used for reaction with the 2,8-dihalogencyclooctanone at a temperature of 0°–30° C.

References Cited in the file of this patent

Beilstein, 9, 44 (1926).
Mousseron et al.: Chem. Abst., 42, 1899 (1948).